United States Patent
Hwang et al.

(10) Patent No.: US 10,427,714 B2
(45) Date of Patent: Oct. 1, 2019

(54) STEERING FEEL CONTROL DEVICE IN STEER-BY-WIRE SYSTEM

(71) Applicants: Hyundai Motor Company, Seoul (KR); Kia Motors Corp., Seoul (KR)

(72) Inventors: Sang Woo Hwang, Seoul (KR); Young Dae Park, Asan-si (KR); Byung Rim Lee, Seongnam-si (KR); Min Jun Kim, Busan (KR); Se Hyun Chang, Suwon-si (KR); Hyeon Seok Cho, Pyeongtaek-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 321 days.

(21) Appl. No.: 15/639,358

(22) Filed: Jun. 30, 2017

(65) Prior Publication Data

US 2018/0162442 A1 Jun. 14, 2018

(30) Foreign Application Priority Data

Dec. 9, 2016 (KR) .................. 10-2016-0167677

(51) Int. Cl.
*B62D 6/00* (2006.01)
*B62D 15/02* (2006.01)
*B62D 5/00* (2006.01)

(52) U.S. Cl.
CPC ............. *B62D 6/008* (2013.01); *B62D 5/005* (2013.01); *B62D 15/021* (2013.01)

(58) Field of Classification Search
CPC ....... B62D 6/008; B62D 5/005; B62D 15/021
See application file for complete search history.

(56) References Cited

U.S. PATENT DOCUMENTS 5,803,202 A * 9/1998 Bohner ............... B62D 5/006
180/402
5,896,942 A * 4/1999 Bohner ............... B62D 5/006
180/402

(Continued)

FOREIGN PATENT DOCUMENTS

| JP | 2009-018662 A | 1/2009 |
| JP | 2009-500219 A | 1/2009 |
| KR | 10-0421423 B1 | 3/2004 |

*Primary Examiner* — Kevin Hurley
*Assistant Examiner* — Michael R Stabley
(74) *Attorney, Agent, or Firm* — Morgan, Lewis & Bockius LLP (57) ABSTRACT

A steering-feel control device in a steer-by-wire system may include a pressure member for rotating in a predetermined direction or an opposite direction within a rotation path depending on the rotation direction of a steering wheel, a push block rotatably provided in the rotation path of the given or opposite direction, a first elastic member for providing elastic restoration force in the rotation direction of the pressure member for elastic variation in the rotational displacement between the pressure member and the push block, and a second elastic member for providing elastic restoration force in the rotation direction of the push block for elastic variation in the rotational displacement when the push block is rotated away from the pressure member, the second elastic member having an elastic constant smaller than that of the first elastic member and being provided in a pre-compressed state to have elastic force greater than that of the first elastic member.

10 Claims, 8 Drawing Sheets

(56) References Cited

U.S. PATENT DOCUMENTS

| | | | |
|---|---|---|---|
| 6,612,392 B2* | 9/2003 | Park | B62D 5/005 180/402 |
| 6,840,346 B2* | 1/2005 | Sugitani | B62D 1/12 180/402 |
| 2017/0247048 A1* | 8/2017 | Namikawa | B62D 3/12 |

* cited by examiner

STEERING FEEL CONTROL DEVICE IN STEER-BY-WIRE SYSTEM

CROSS-REFERENCE TO RELATED APPLICATION

The present application claims priority to Korean Patent Application No. 10-2016-0167677, filed on Dec. 9, 2016, the entire contents of which is incorporated herein for all purposes by this reference.

BACKGROUND OF THE INVENTION

Field of the Invention

The present invention relates to a steering feel control device in a steer-by-wire system, which realizes a natural sense of steering at the initial stage of steering input, and prevents a rapid increase in steering feedback torque at a specific steering angle or more.

Description of Related Art

A steer-by-wire system is a steering system that eliminates the mechanical connection between a steering wheel and vehicle wheels. The steer-by-wire system may receive a rotation signal from the steering wheel through an electronic control unit (ECU), and operate a steering motor, which is connected to the vehicle wheels, based on the input rotation signal, thereby implementing vehicle steering.

With the elimination of a mechanical connection structure included in a conventional steering system, such a steer-by-wire system has advantages including increased freedom of layout due to the configuration of the steering system, improved fuel efficiency, and prevention of any reversely input disturbance from the vehicle wheels.

On the other hand, the absence of the mechanical connection structure makes it impossible to provide a driver with required correct steering information feedback.

For example, a conventional steering system does not need to separately generate steering feedback because it includes a mechanical connection structure using, for example, a universal joint, whereas the steer-by-wire system needs to generate steering feedback or restoration feedback using, for example, a spring or a motor, because it includes no mechanical connection structure.

However, in the generation of steering feedback using a spring, normally, only a single spring is used to provide steering feedback. In this case, however, spring force needs to be continuously increased as the steering angle is increased, and the generation of consistent feedback torque between leftward steering and rightward steering is impossible because the spring has different tensile and compressive properties.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a steering feel control device in a steer-by-wire system, which realizes a natural sense of steering at the initial stage of steering input, prevents a rapid increase in steering feedback torque at a specific steering angle or more, and generates consistent steering feedback torque between leftward steering and rightward steering.

In accordance with an aspect of the present invention, the above and other objects can be accomplished by the provision of a steering feel control device in a steer-by-wire system, the device including a pressure member configured to be rotated in a given direction or in an opposite direction within a set rotation path depending on a direction in which a steering wheel is rotated, a push block rotatably provided in the rotation path of the given direction or the opposite direction, a first spring configured to provide elastic restoration force with respect to a rotation direction of the pressure member to enable elastic variation in a rotational displacement between the pressure member and the push block, and a second spring configured to provide elastic restoration force with respect to a rotation direction of the push block to enable elastic variation in a rotational displacement when the push block is rotated away from the pressure member, the second spring having a spring constant smaller than that of the first spring and being provided in a pre-compressed state at a steering angle neutral position to have spring force greater than that of the first spring.

The steering feel control device may further include a column shaft configured to rotate along with the steering wheel, a housing provided at a lateral side of the column shaft, the pressure member and the push block being accommodated in the housing to be rotatable in the rotation path within a predetermined radius about a rotation shaft, a ring member having a ring shape to surround an external circumferential surface of the housing, the ring member being coupled to and rotated along with the pressure member, and a power transmission device configured to connect the column shaft and the ring member to each other to reduce and transmit rotational force of the column shaft to the ring member.

The steering feel control device may further include a displacement limitation stopper provided in a rotation path between a neutral point of the pressure member, which corresponds to the steering angle neutral position of the steering wheel, and the push block to limit rotation of the push block toward the neutral point of the pressure member, and the second spring may be provided in a pre-compressed state at the steering angle neutral position of the steering wheel to be supported by the displacement limitation stopper.

The second spring may be provided in the pre-compressed state so that the first spring and the second spring have the same torque when the first spring is maximally compressed by rotation of the pressure member and the push block is supported by the displacement limitation stopper.

The displacement limitation stopper may protrude toward the center of the rotation path provided in the housing, the push block may have a thickness such that it is located in the rotation path in which the displacement limitation stopper is provided, and the pressure member may have a thickness such that it deviates from the rotation path in which the displacement limitation stopper is provided.

The steering feel control device may further include an end stopper provided at a point opposite to the neutral point of the pressure member about the rotation shaft, the first spring may be a torsion spring having one end portion supported by an end portion of the pressure member and a remaining end portion supported by one end portion of the push block, and the second spring may be a torsion spring having one end portion supported by a remaining end portion of the push block and a remaining end portion supported by an end portion of the end stopper.

The steering feel control device may further include a lock device configured to permit or limit rotation of the push block, at a position at which the push block is supported by the displacement limitation stopper, away from the pressure member depending on variation in a steering angle of the steering wheel.

The lock device may include a solenoid valve configured to be caught by the push block, which is supported by the displacement limitation stopper, to limit the rotation of the push block, a steering angle sensor configured to measure the steering angle of the steering wheel, and a controller configured to release the solenoid valve to permit the rotation of the push block when the steering angle of the steering wheel is equal to or greater than a reference angle.

The lock device may include a locking wedge having a wedge shape, the locking wedge being configured to limit the rotation of the push block when a vertical surface at one side thereof is caught by the push block supported by the displacement limitation stopper, an unlocking wedge having a wedge shape, a slope of which is oriented in a direction opposite to that of the locking wedge, the unlocking wedge being coupled to a lower end portion of the locking wedge with a predetermined gap therebetween, an unlocking plate configured to be rotated along with the pressure member, the unlocking plate coming into frictional contact with the slope of the unlocking wedge to vertically linearly move the locking wedge and the unlocking wedge together, and a return spring configured to provide elastic restoration force with respect to a direction in which the unlocking wedge is moved.

In accordance with another aspect of the present invention, there is provided a feedback device including a pressure member configured to receive rotational force and to be rotated in a given direction or in an opposite direction within a predetermined rotation path about a rotation shaft, a push block rotatably provided in the rotation path of the given direction or the opposite direction, a first spring configured to provide elastic restoration force with respect to a rotation direction of the pressure member to enable elastic variation in a rotational displacement between the pressure member and the push block, and a second spring configured to provide elastic restoration force with respect to a rotation direction of the push block to enable elastic variation in a rotational displacement when the push block is rotated away from the pressure member, the second spring having a spring constant smaller than that of the first spring and being provided in a pre-compressed state in a state in which the pressure member is located at a center of the rotation path to have spring force greater than that of the first spring.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiments of the present invention will be described in more detail with reference to the accompanying drawings.

A steering feel control device in a steer-by-wire system according to an exemplary embodiment of the present invention may include a pressure member 13, a push block 15, an end stopper 23, a first spring 19, and a second spring 21.

Figure 1:
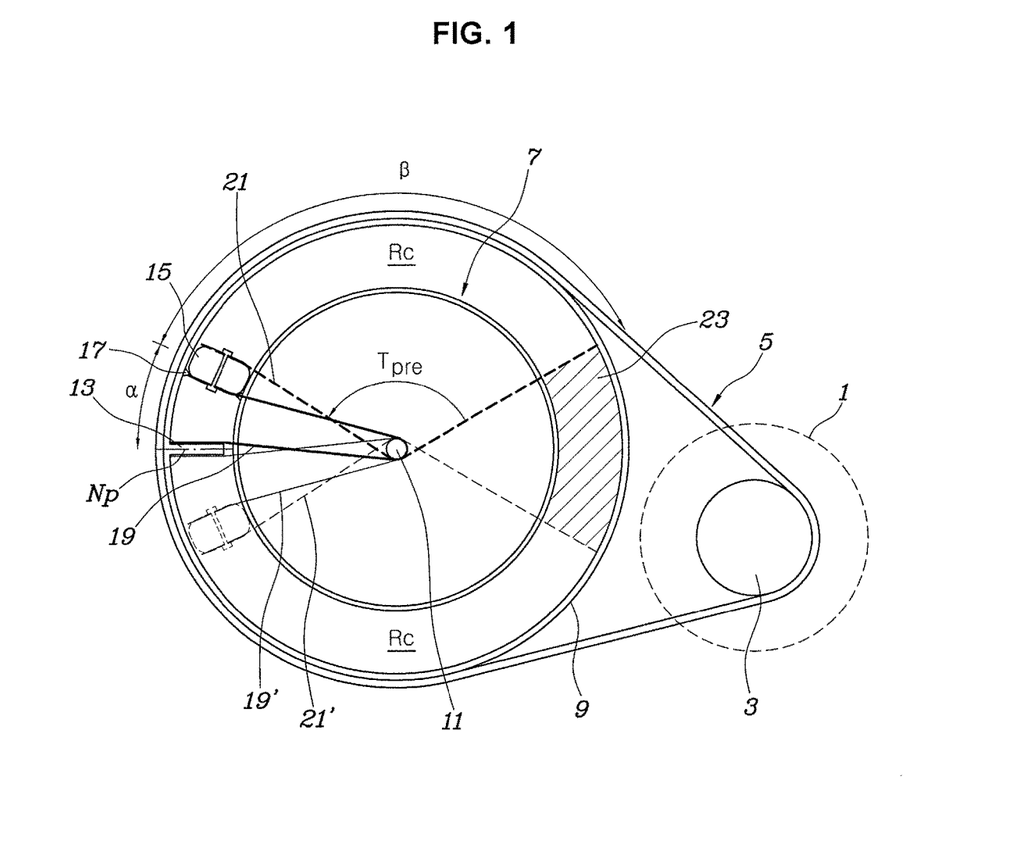
FIG. 1 is a plan view illustrating the coupling relationships between constituent elements of a steering feel control device according to an exemplary embodiment of the present invention.

Referring to FIG. 1, the pressure member 13 may be rotated in a given direction or in an opposite direction from the steering angle neutral position of a steering wheel 1 within a rotation path Re, which is set about a rotation shaft 11, depending on the direction in which the steering wheel 1 is rotated.

For example, the rotational force of the steering wheel 1 may be transferred to the pressure member 13. When the steering wheel 1 is turned leftward or rightward, the pressure member 13 may be rotated about the rotation shaft 11 in the clockwise direction or in the counterclockwise direction within a predetermined radius of rotation.

The push block 15 may be rotatably provided in the rotation path Rc of the pressure member 13 in a given direction or in an opposite direction.

For example, the push block 15 may be disposed in the rotation path Re of a given direction or in the rotation path Re of an opposite direction on the basis of the position of the pressure member 13, which corresponds to the steering angle neutral position of the steering wheel 1. The push block 15 may be rotated along the rotation path Re.

The first spring 19 may provide elastic restoration force with respect to the direction in which the pressure member 13 is rotated, to enable variation in the rotational displacement between the pressure member 13 and the push block 15.

The second spring 21 may provide elastic restoration force with respect to the direction in which the push block 15 is rotated, to enable elastic variation in the rotational displacement when the push block 15 is rotated away from the pressure member 13. The second spring 21 has a spring constant smaller than that of the first spring 19, but exerts spring force greater than that exerted by the first spring 19 at the steering angle neutral position.

That is, according to the configuration described above, when the steering wheel 1 is turned in a given direction from the steering angle neutral position thereof, the pressure member 13 is rotated at the initial stage of steering, causing the first spring 19, which has a relatively large spring constant, but has small spring force, to be first compressed to provide the steering wheel 1 with steering feedback. Accordingly, a natural sense of steering may be realized at the initial stage of steering input.

Subsequently, when the steering angle of the steering wheel 1 is increased to a predetermined angle or more, the pressure member 13 pushes the push block 15, causing the second spring 21 to be compressed therewith. At this time, because the second spring 21 has a relatively small spring constant, no excessive increase in steering feedback occurs even when the steering angle of the steering wheel 1 is increased.

In addition, in both cases where the steering wheel 1 is turned leftward and is turned rightward, feedback torque is provided using compressive force of the spring when the steering angle is increased and using tensile force of the spring when the steering angle is reduced. In addition, in both cases where the steering wheel 1 is turned leftward and is turned rightward, there is no effect of spring torque at the opposite side. Accordingly, uniform steering feedback and restoration torque may be realized between leftward steering and rightward steering.

That is, as illustrated in FIG. 1, feedback torque is provided using the compressive force and tensile force of the first spring and the second spring (see reference numerals 19 and 21) when the steering wheel 1 is turned rightward, and feedback torque is provided using the compressive force and tensile force of the first spring and the second spring (see reference numerals 19' and 21') when the steering wheel 1 is turned leftward, whereby uniform steering torque between leftward steering and rightward steering may be realized.

Figure 2:
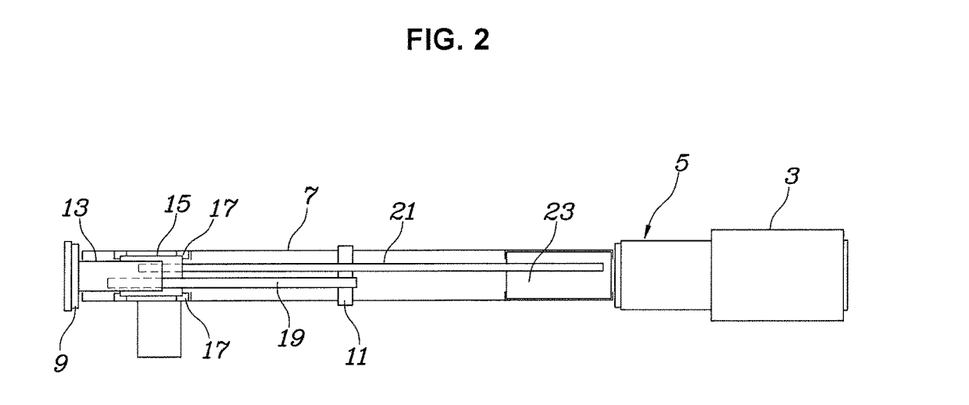
FIG. 2 is a front view illustrating the coupling relationships between constituent elements of the steering feel control device according to an exemplary embodiment of the present invention.

Next, the structure of the steering feel control device of the present invention will be described in more detail with reference to FIG. 1 and FIG. 2. In the steering feel control device, a column shaft 3 may be coupled to the bottom of the steering wheel 1 to be rotated together with the steering wheel 1.

In addition, a housing 7 having a cylindrical shape is disposed at the lateral side of the column shaft 3. The pressure member 13 and the push block 15 may be provided inside the housing 7. At this time, because the rotation shaft 11 is provided at the center of the housing 7, the pressure member 13 and the push block 15 may be rotatably provided in the rotation path RC within a predetermined radius about the rotation shaft 11.

In addition, a ring member 9 having a ring shape may be provided to surround the external circumferential surface of the housing 7. The ring member 9 may be coupled to and rotated along with the pressure member 13.

For example, the end portion of the pressure member 13 may protrude to the external circumferential surface of the housing 7, and the internal surface of the ring member 9 may be fixed to the protruding end portion of the pressure member 13.

In addition, because the housing 7 is disposed at the lateral side of the column shaft 3, the column shaft 3 and the ring member 9 may be connected to each other via a power transmission device 5 so that the rotational force of the column shaft 3 may be decreased and transmitted to the ring member 9.

For example, the power transmission device 5 is realized such that the column shaft 3 and the ring member 9 take the form of a driving pulley and a driven pulley respectively, which are connected to each other via a belt. The speed-reduction ratio of the column shaft 3 and the ring member 9 may be 4:1.

That is, during the steering of the steering wheel 1, the ring member 9 is rotated, rotating the pressure member 13 coupled thereto. Accordingly, the first spring 19 may be compressed or stretched depending on variation in the rotation angle of the pressure member 13, and the second spring 21 may also be compressed or stretched via the simultaneous rotation of the push block 15. Accordingly, the steering wheel 1 may be provided with steering feedback and restoration feedback by the spring force of the first spring 19 and the second spring 21.

Meanwhile, the steering feel control device of the present invention may include a displacement limitation stopper 17, which is provided in the rotation path Rc between the neutral point Np of the pressure member 13, which corresponds to the steering angle neutral position of the steering wheel 1, and the push block 15, and is configured to prevent the push block 15 from being rotated toward the neutral point Np of the pressure member 13.

Here, the neutral point Np of the pressure member 13 may be located in the left end portion of the housing 7 illustrated in FIG. 1, and the extension line from the center of the end stopper 23 to the rotation shaft 11 may overlap the rotation path Rc at the neutral point Np.

In addition, at the steering angle neutral position of the steering wheel 1, the second spring 21 may be provided in a pre-compressed state to be supported by the displacement limitation stopper 17.

The second spring 21 may be provided in a pre-compressed state so that the torque of the first spring 19 and the torque of the second spring 21 become the same as each other in the state in which the first spring 19 is maximally compressed by the rotation of the pressure member 13 and the push block 15 is supported by the displacement limitation stopper 17.

For example, referring to FIG. 1, when the spring constant of the first spring 19 is k1, the spring constant of the second spring 21 is k2, the rotation angle for the maximum compression of the first spring 19 is α, and the torque of the pre-compressed second spring 21 is $T_{pre}$, the following relationships may be established:

k1 >k2, (ex: k1=0.2 Nm/deg, k2=0.005 Nm/deg)
$T_{pre}$=k1×α(ex: $T_{pre}$=0.5 Nm)

That is, when the torque for the pre-compression of the second spring 21 is designed to k1×α, because the torque of the first spring 19 is smaller than the torque of the second spring 21 while the pressure member 13 is rotated from 0°, which is the steering angle neutral position, to α°, the push block 15 may be supported by the displacement limitation stopper 17 under the influence of $T_{pre}$, and thus only the first spring 19 may be compressed to provide steering feedback.

However, when the rotation angle of the pressure member 13 exceeds α°, the second spring 21 begins to be compressed by the steering force provided from the steering wheel 1, being able to provide steering feedback.

Next, the structure of limiting the rotation of the push block 15 via the displacement limitation stopper 17 will be described with reference to FIG. 2. The displacement limitation stopper 17 may be provided to protrude toward the rotation path Rc, which is provided in the housing 7.

At this time, the push block 15 may have a thickness such that it is configured for being located in the rotation path Rc in which the displacement limitation stopper 17 is provided, and the pressure member 13 may have a thickness such that it is configured for deviating from the rotation path Rc in which the displacement limitation stopper 17 is provided.

That is, in the state in which the rotation path Rc is provided in the housing 7 and a pair of displacement limitation stoppers 17 protrudes from the upper surface and the lower surface of the housing 7, the push block 15 has a vertical thickness such that the upper end portion and the lower end portion of the push block 15 are caught by the displacement limitation stoppers 17. Accordingly, when the push block 15 is rotated, the push block 15 may be caught by the displacement limitation stoppers 17.

On the other hand, the vertical thickness of the pressure member 13 may be smaller than the gap between the displacement limitation stoppers 17. Accordingly, when the pressure member 13 is rotated, the pressure member 13 may be rotated along the rotation path Rc without being caught by the displacement limitation stoppers 17.

Figure 3:
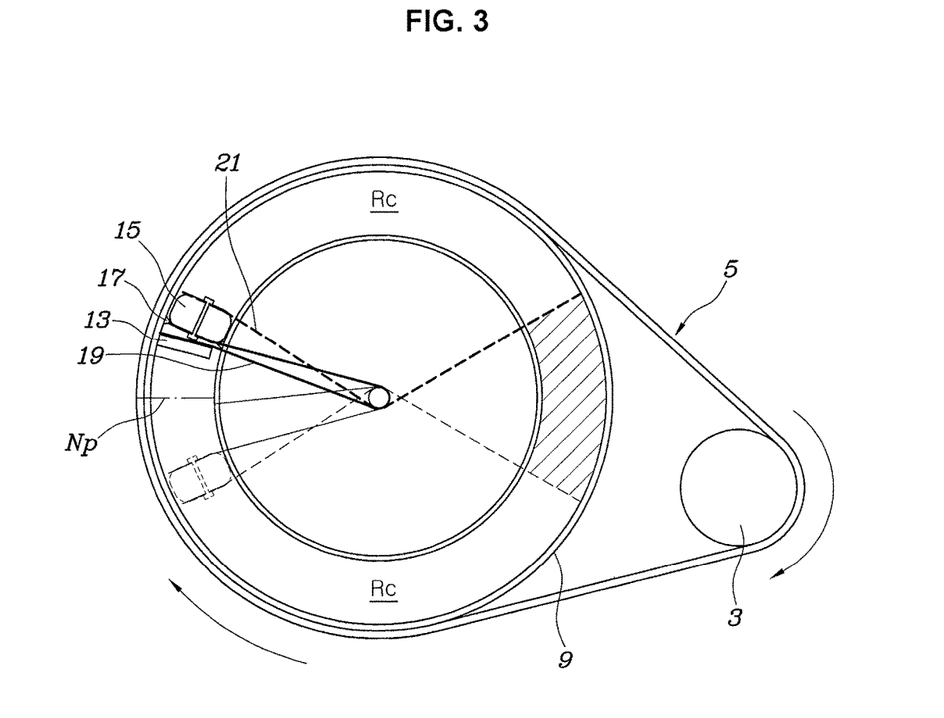
FIG. 3 is a view for explaining the operating state at the initial stage of steering, in which a first spring is maximally compressed, in the case of one-directional steering according to an exemplary embodiment of the present invention.
Figure 4:
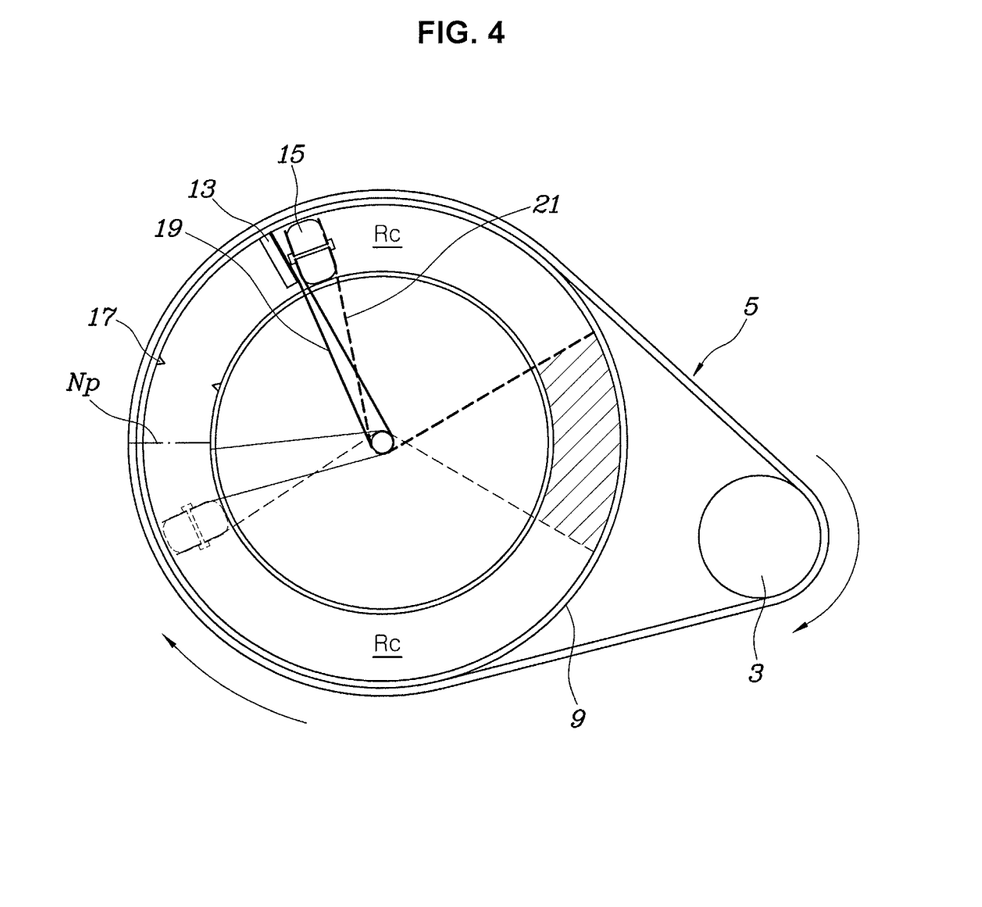
FIG. 4 is a view for explaining the operating state at the medium stage of steering, in which a second spring is partially compressed, subsequent to the state illustrated in FIG. 3.

Meanwhile, referring to FIGS. 1, 3 and 4, the end stopper 23 may be provided at the end portion of the rotation path Rc of the pressure member 13 in a given direction or in an opposite direction.

For example, the end stopper 23 may be disposed at the position opposite to the neutral point Np of the pressure member 13, which corresponds to the steering angle neutral position of the steering wheel 1, about the rotation shaft 11. Accordingly, during the full-turn manipulation of the steering wheel 1 in a given direction or in an opposite direction, when the push block 15, which is rotated together with the pressure member 13, is rotated along the rotation path Rc to be caught by the end stopper 23, the steering wheel 1 is not rotated. In this way, the maximum steering angle of the steering wheel 1 may be mechanically limited.

Then, with regard to the first spring 19 and the second spring 21, the first spring 19 may be a torsion spring, which has a middle end portion caught by the rotation shaft 11, one end portion supported by the end portion of the pressure member 13, and the other end portion supported by one end portion of the push block 15.

In addition, the second spring 21 may be a torsion spring, which has a middle end portion caught by the rotation shaft 11, one end portion supported by the other end portion of the push block 15, and the other end portion supported by the end portion of the end stopper 23.

That is, the rotational displacement between the pressure member 13 and the push block 15 may be elastically adjusted via the compression and tension of the first spring 19, and the rotational displacement between the push block 15 and the end stopper 23 may be elastically adjusted via the compression and tension of the second spring 21.

Meanwhile, according to an exemplary embodiment of the present invention, a lock device may be provided to more accurately control the point in time at which the push block 15 is rotated.

The lock device may permit or limit the rotation of the push block 15, at the position at which the push block 15 is supported by the displacement limitation stopper 17, away from the pressure member 13 depending on variation in the steering angle of the steering wheel 1.

Figure 6:
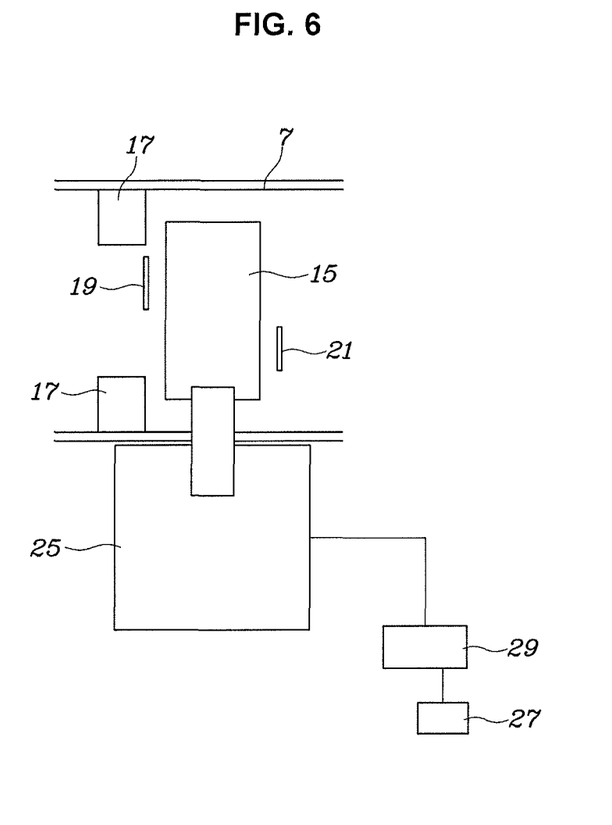
FIG. 6 is a view for explaining the configuration of various exemplary embodiments of a lock device according to an exemplary embodiment of the present invention.

The configuration of various exemplary embodiments of the lock device will now be described with reference to FIG. 6. In the present configuration, a solenoid valve 25 may be provided to be caught by the push block 15, which is supported by the displacement limitation stopper 17, being configured for limiting the rotation of the push block 15.

In addition, a steering angle sensor 27 may be provided to measure the steering angle of the steering wheel 1.

Thus, in response to a received signal indicating the steering angle of the steering wheel 1, a controller 29 may release the solenoid valve 25 to permit the rotation of the push block 15 when the steering angle is equal to or greater than a reference angle. On the other hand, when the steering angle is less than the reference angle, the controller 29 may keep the solenoid valve 25 in the caught state.

That is, when the pressure member 13 is rotated beyond α° from the steering angle neutral position of the steering wheel 1 when the steering wheel 1 is turned, the controller 29 releases the solenoid valve 25 to permit the rotation of the push block 15. Accordingly, the push block 15 is rotated with the pressure member 13 along the rotation path Re, facilitating the provision of steering feedback.

Figure 7A:
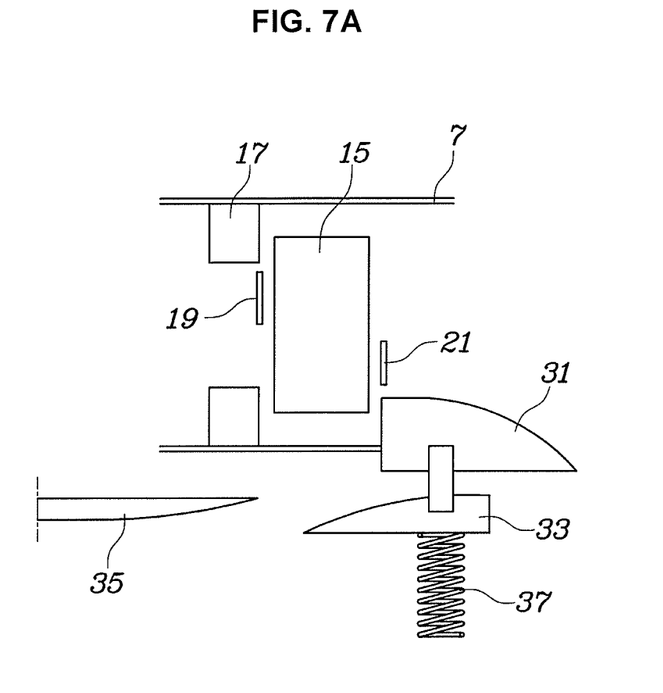
FIG. 7A, FIG. 7B, and FIG. 7C are views for explaining an unlocking operation in response to variation in steering angle, in addition to the configuration of various exemplary embodiments of the lock device according to an exemplary embodiment of the present invention.
Figure 7B:
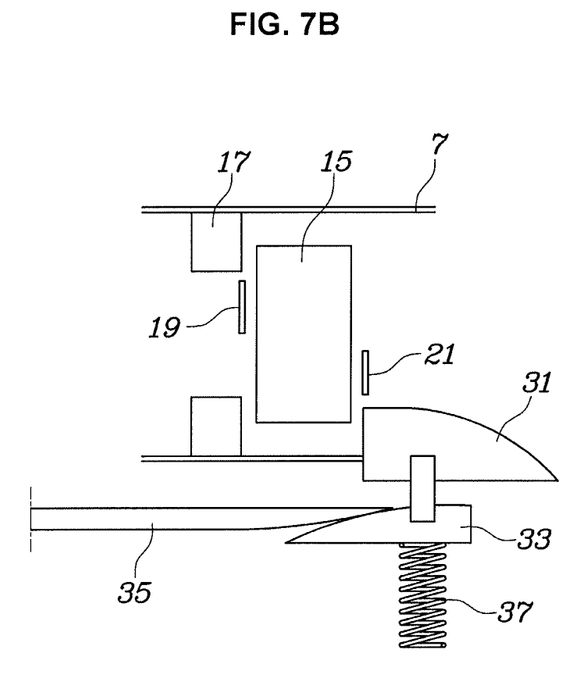
Figure 7C:
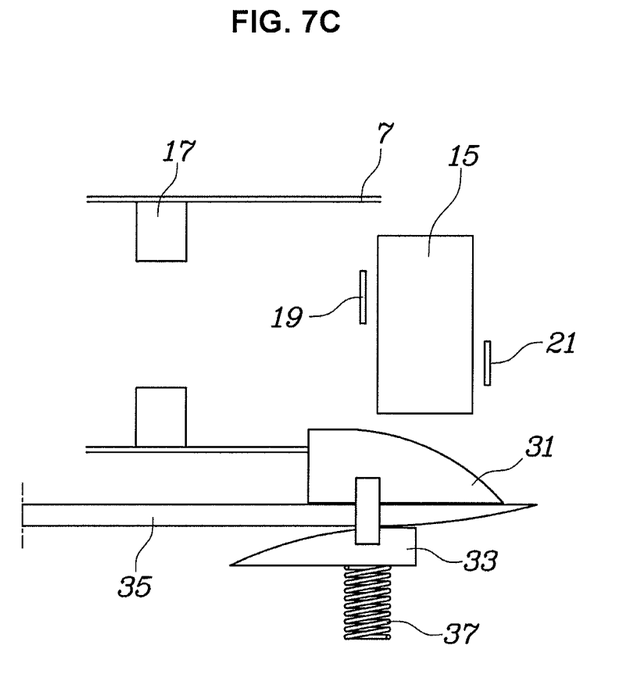

Next, the configuration of various exemplary embodiments of the lock device will be described with reference to FIG. 7A, FIG. 7B, and FIG. 7C. In the present configuration, a locking wedge 31 having a wedge shape may be provided. The locking wedge 31 may have a vertical surface at one side thereof so that the vertical surface of the locking wedge 31 is caught by the push block 15 supported by the displacement limitation stopper 17 to limit the rotation of the push block 15.

In addition, an unlocking wedge 33, which has a wedge shape, the slope of which is oriented in a direction opposite to that of the locking wedge 31, may be provided. The unlocking wedge 33 may be coupled to the lower end portion of the locking wedge 31, with a predetermined gap therebetween.

In addition, an unlocking plate 35 may be provided to be rotated along with the pressure member 13. The lower surface of the unlocking plate 35 may come into frictional contact with the slope of the unlocking wedge 33 to vertically linearly move the locking wedge 31 and the unlocking wedge 33 together.

For example, the unlocking plate 35 may be coupled to the ring member 9, which is coupled to the pressure member 13.

In addition, a return spring 37 may be provided to provide elastic restoration force with respect to the direction in which the unlocking wedge 33 is moved. At this time, the return spring 37 may be a coil spring, which is fixed to the lower end portion of the unlocking wedge 33.

That is, when the pressure member 13 is rotated beyond α° from the steering angle neutral position of the steering wheel 1 when the steering wheel 1 is turned, the ring member 9 and the unlocking plate 35 are rotated together, pushing the unlocking wedge 33 downward. Accordingly, the locking wedge 31 is downwardly separated from the push block 15, permitting the rotation of the push block 15. Accordingly, in addition to the pressure member 13, the push block 15 is rotated along the rotation path Re, providing steering feedback.

Meanwhile, note that the steering feel control device of the present invention illustrated in FIG. 1 may be applied to other feedback devices for preventing a rapid increase in feedback torque.

Such a feedback device may include the pressure member 13, the push block 15, the first spring 19, and the second spring 21.

Describing the above configuration in more detail, the feedback emulation device may include the pressure member 13, to which rotational force is transferred so that the pressure member 13 is rotated in a given direction or in an opposite direction within a predetermined rotation path about a rotation shaft, the push block 15, which is rotatably provided in the rotation path in a given direction or in an opposite direction, the first spring 19, which provides elastic restoration force with respect to the rotation direction of the pressure member 13 to enable elastic variation in the rotational displacement between the pressure member 13 and the push block 15, and the second spring 21, which provides elastic restoration force with respect to the rotation direction of the push block 15 to enable elastic variation in the rotational displacement when the push block 15 is rotated away from the pressure member 13, the second spring 21 having a spring constant smaller than that of the first spring 19 and being provided in a pre-compressed state in the state in which the pressure member 13 is located at the center of the rotation path to have spring force greater than that of the first spring 19.

That is, according to the above-described configuration, when the pressure member 13 is rotated upon receiving specific rotational force transferred thereto, the first spring 19, which has smaller spring force, may be compressed first at the initial stage of rotation, providing feedback.

Subsequently, when the rotation angle of the pressure member 13 is increased, the pressure member 13 begins to push the push block 15, causing the second spring 21 to be compressed. Because the spring constant of the second spring 21 is smaller than the spring constant of the first spring 19, an excessive increase in feedback may be prevented even when the rotation angle of the pressure member 13 is increased.

Hereinafter, a steering feedback operation using the steering feel control device of the present invention will be described.

Referring to FIG. 1, at the position of 0°, which corresponds to the steering angle neutral state of the steering wheel 1, the pressure member 13 is located at the neutral point Np.

When the steering wheel is turned rightward in this state, as illustrated in FIG. 3, the pressure member 13 is rotated in the clockwise direction along the rotation path Rc, causing the first spring 19 to be compressed. Accordingly, steering feedback may be provided to the steering wheel 1 by the spring force of the first spring 19 until the pressure member 13 pushes the push block 15.

Figure 5:
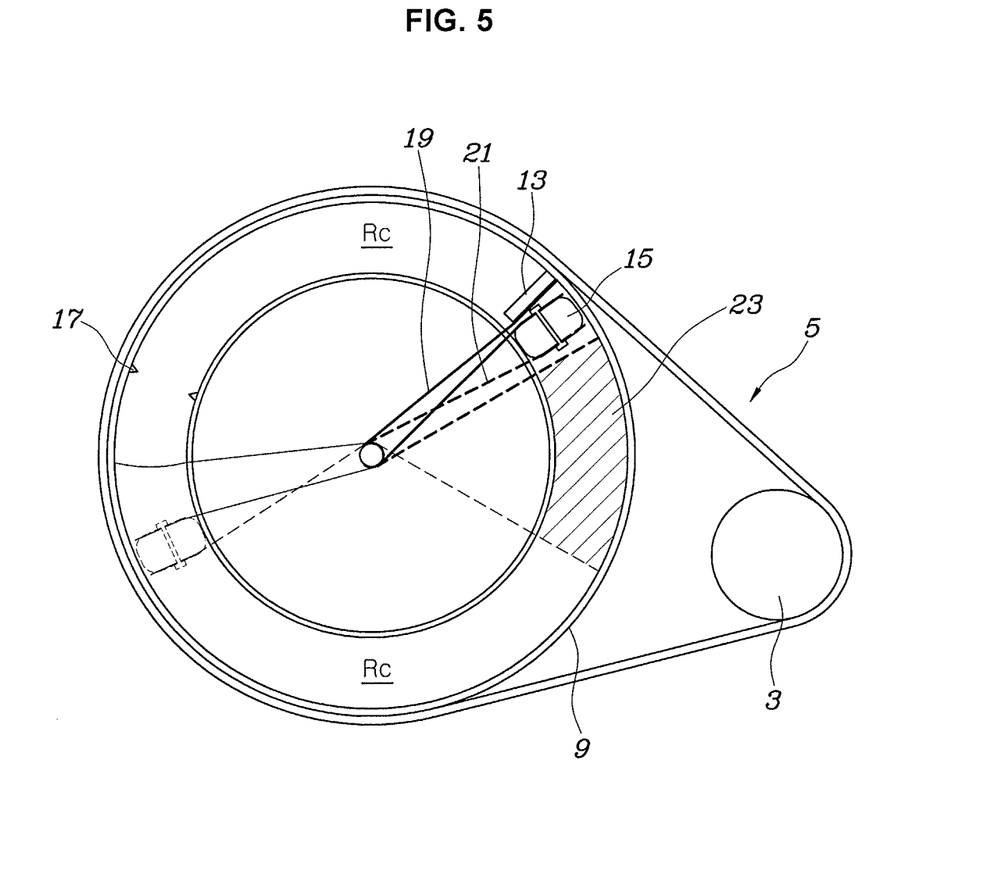
FIG. 5 is a view for explaining the full-turn operating state, in which the second spring is maximally compressed, subsequent to the state illustrated in FIG. 4.

Subsequently, when the pressure member 13 begins to push the push block 15, as illustrated in FIG. 4, the push block 15 is rotated together with the pressure member 13, causing the second spring 21 to be compressed. Accordingly, steering feedback may be provided to the steering wheel 1 by the spring force of the second spring 21 until the push block 15 reaches the end stopper 23, as illustrated in FIG. 5.

At this time, in the state in which the steering wheel 1 is turned rightward so that the first spring 19 and the second spring 21 are compressed, no compression or tension is applied to the first spring 19 or the second spring 21 at the opposite side, which are operated when the steering wheel 1 is turned leftward. Accordingly, uniform steering torque may be realized between the leftward steering and the rightward steering of the steering wheel 1.

As is apparent from the above description, when the steering wheel is turned from the steering angle neutral position of the steering wheel, a first spring is first compressed at the initial stage of steering to provide steering feedback, realizing a natural sense of steering at the initial stage of steering input. Then, when the steering angle is increased to a predetermined angle or more, a second spring, which has a relatively small spring constant, is compressed to provide steering feedback, preventing an excessive increase in steering feedback even when the steering angle is increased.

In addition, in both cases where the steering wheel is turned leftward and is turned rightward, feedback torque is provided using compressive force of the spring when the steering angle is increased and using tensile force of the spring when the steering angle is reduced. Accordingly, uniform steering feedback and restoration torque may be realized between leftward steering and rightward steering.

Although the exemplary embodiments of the present invention have been described above with reference to the accompanying drawings, those skilled in the art will appreciate that the present invention can be implemented in various other embodiments without changing the technical ideas or features thereof The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings.

The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering feel control device in a steer-by-wire system, the device comprising:
   a pressure member configured to be rotated in a predetermined direction or in an opposite direction to the predetermined direction within a predetermined rotation path depending on a direction in which a steering wheel is rotated;
   a push block rotatably provided in the predetermined rotation path of the predetermined direction or the opposite direction;
   a first elastic member configured to provide elastic restoration force with respect to a rotation direction of the pressure member to enable elastic variation in a rotational displacement between the pressure member and the push block; and a second elastic member configured to provide elastic restoration force with respect to a rotation direction of the push block to enable elastic variation in a rotational displacement when the push block is rotated away from the pressure member, the second elastic member having an elastic constant smaller than an elastic constant of the first elastic member and being provided in a pre-compressed state at a steering angle neutral position to have elastic force greater than elastic force of the first elastic member.

2. The device according to claim 1, further including:

a column shaft configured to rotate along with the steering wheel;

a housing provided at a lateral side of the column shaft, the pressure member and the push block being accommodated in the housing to be rotatable in the rotation path within a predetermined radius about a rotation shaft;

a ring member having a ring shape to surround an external circumferential surface of the housing, the ring member being coupled to and rotated along with the pressure member; and a power transmission device configured to connect the column shaft and the ring member to each other to reduce and transmit rotational force of the column shaft to the ring member.

3. The device according to claim 2, further including a displacement limitation stopper provided in the rotation path between a neutral point of the pressure member, which corresponds to the steering angle neutral position of the steering wheel, and the push block to limit rotation of the push block toward the neutral point of the pressure member, wherein the second elastic member is provided in a pre-compressed state at the steering angle neutral position of the steering wheel and wherein the push block is supported by the displacement limitation stopper.

4. The device according to claim 3, wherein, in the pre-compressed state of the second elastic member, the first elastic member and the second elastic member are configured to have a same torque when the first elastic member is maximally compressed by rotation of the pressure member and the push block is supported by the displacement limitation stopper.

5. The device according to claim 3, wherein the displacement limitation stopper is provided in the rotation path inside the housing;

wherein the push block is formed to be located in the rotation path in which the displacement limitation stopper is provided; and wherein the pressure member is formed to deviate from the rotation path in which the displacement limitation stopper is provided.

6. The device according to claim 4, further including an end stopper provided at a point opposite to the neutral point of the pressure member about the rotation shaft, wherein the first elastic member is a torsion elastic member having a first end portion supported by an end portion of the pressure member and a remaining end portion thereof supported by a first end portion of the push block; and the second elastic member is a torsion elastic member having a first end portion supported by a remaining end portion of the push block and a remaining end portion supported by an end portion of the end stopper.

7. The device according to claim 4, further including a lock device configured to permit or limit rotation of the push block, at a position at which the push block is supported by the displacement limitation stopper, away from the pressure member depending on variation in a steering angle of the steering wheel.

8. The device according to claim 7, wherein the lock device includes:

a solenoid valve configured to be caught by the push block, which is supported by the displacement limitation stopper, to limit the rotation of the push block;

a steering angle sensor configured to measure the steering angle of the steering wheel; and a controller configured to release the solenoid valve to permit the rotation of the push block when the steering angle of the steering wheel is equal to or greater than a reference angle.

9. The device according to claim 7, wherein the lock device includes:

a locking wedge having a wedge shape, the locking wedge being configured to limit the rotation of the push block when a vertical surface at a first side thereof is caught by the push block supported by the displacement limitation stopper;

an unlocking wedge having a wedge shape, a slope of which is oriented in a direction opposite to that of the locking wedge, the unlocking wedge being coupled to a lower end portion of the locking wedge with a predetermined gap therebetween;

an unlocking plate configured to be rotated along with the pressure member, the unlocking plate coming into frictional contact with the slope of the unlocking wedge to vertically linearly move the locking wedge and the unlocking wedge together; and an elastic member configured to provide elastic restoration force with respect to a direction in which the unlocking wedge is configured to be moved.

10. A feedback device comprising:

a pressure member configured to receive a rotational force and to be rotated in a predetermined direction or in an opposite direction to the predetermined direction within a predetermined rotation path about a rotation shaft;

a push block rotatably provided in the predetermined rotation path of the predetermined direction or the opposite direction;

a first elastic member configured to provide an elastic restoration force with respect to a rotation direction of the pressure member to enable elastic variation in a rotational displacement between the pressure member and the push block; and a second elastic member configured to provide an elastic restoration force with respect to a rotation direction of the push block to enable an elastic variation in a rotational displacement when the push block is rotated away from the pressure member, the second elastic member having an elastic constant smaller than an elastic constant of the first elastic member and being provided in a pre-compressed state in a state in which the pressure member is located at a center of the rotation path to have elastic force greater than an elastic force of the first elastic member.

* * * * *